E. R. ALEXANDER.
RADIATOR INDICATOR ATTACHING AND POSITIONING MECHANISM.
APPLICATION FILED JULY 19, 1915.
1,162,673.
Patented Nov. 30, 1915.
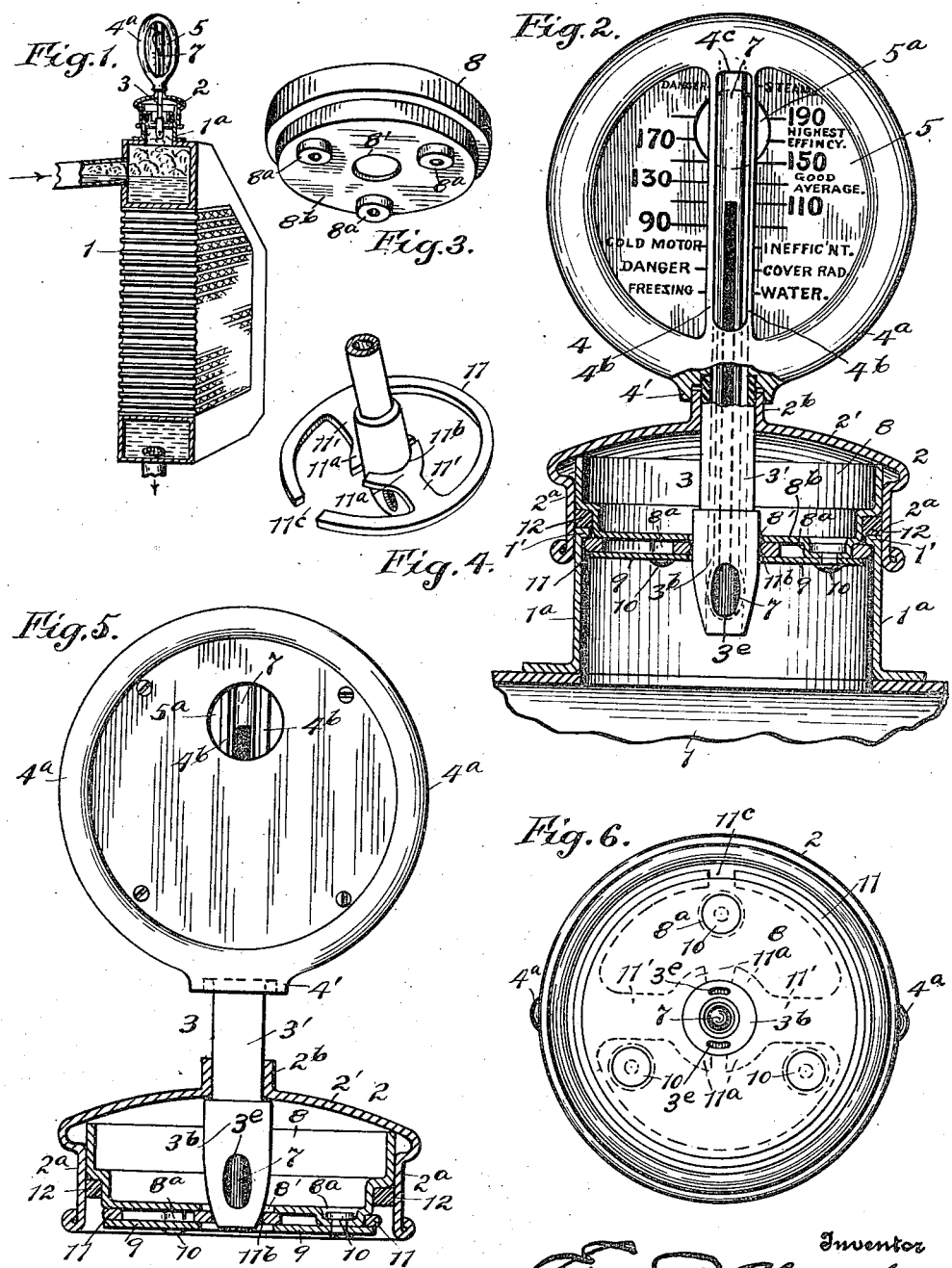

UNITED STATES PATENT OFFICE.

EDWARD R. ALEXANDER, OF CLEVELAND, OHIO.

RADIATOR-INDICATOR ATTACHING AND POSITIONING MECHANISM.

1,162,673.

Specification of Letters Patent.

Patented Nov. 30, 1915.

Application filed July 19, 1915. Serial No. 40,591.

*To all whom it may concern:*

Be it known that I, EDWARD R. ALEXANDER, a citizen of the United States, residing at Cleveland, in the county of Cuyahoga and State of Ohio, have invented certain new and useful Improvements in and Relating to Radiator-Indicator Attaching and Positioning Mechanism, of which the following is a specification.

This invention relates to the idea of so combining a cap or closure for a radiator filler duct and an indicator of the condition of the circulating medium in the radiator that they coöperate, the cap or closure to support and properly position the indicator in addition to its function of closing the duct and the indicator to control and effect by its movement relative thereto, the attachment and detachment of the cap, in addition to its function of indicating the condition of the circulating fluid.

An object of my invention is to provide for a radiator filling duct a closure or cap which may be readily and quickly attached or detached, and which has coöperatively combined with it for such purpose mechanism which also indicates the condition of the circulating liquid in the radiator.

Another object of my invention is to provide a thermometer supporting and positioning element so combined with a cap for a radiator filling duct that movement of said supporting and positioning element relative to the filler cap serves to detach or attach the filler cap and properly position the thermometer within the duct.

Other objects of my invention will be obvious from the description of an apparatus embodying it which I have herein selected for the purpose of illustration.

Figure 1 is a perspective view of a radiator provided with my improved means for attaching a thermometer to and positioning it within the radiator filling duct. Fig. 2 illustrates a radiator filling duct in section provided with my improved means for attaching a thermometer to and positioning it within said duct. Figs. 3 and 4 illustrate details. Fig. 5 illustrates the thermometer and its attaching and positioning mechanism in the relation which the parts bear to each other when the thermometer is withdrawn from the filling duct. Fig. 6 is a bottom plan view of the parts shown in Fig. 5.

In the drawings, 1 indicates a radiator of any suitable type for a hydro-carbon motor, having an inlet duct or filling opening $1^a$. Near its upper end this duct or inlet passageway is preferably provided with an inturned flange or shoulder 1', constructed in any desired manner.

2 is a cap piece or shell having a top wall 2' from which extends a tubular section $2^a$, the latter being adapted to fit snugly over and preferably engage the outer wall of the duct $1^a$. The top wall 2' carries an axially disposed annular boss $2^b$ through which extends a tubular shaft 3' of a combined operating plunger and a thermometer tube support 3.

4 is a frame suitably secured to the upper end of the tube support 3 and having a boss 4' to receive the annular extension $2^b$, circumferential walls $4^a$ for supporting a suitable thermometer dial or index 5, and a thermometer tube guard $4^b$. The tube 3' may be secured at its upper end to the frame 4 in any suitable manner, as by soldering or brazing.

The dial 5 may be secured in the frame 4 in any suitable manner. It preferably is provided at $5^a$ either with an opening or an indicating spot, so that when the mercury in the tube passes above the opening or the spot, the operator of the motor may readily see that the radiating liquid is hotter than it should be.

7 is a thermometer having its lower end arranged within the tubular section 3', extending thence outwardly through an alined opening in the boss 4', thence between the guides $4^b$ and having its upper end seated in recess $4^c$ in the top of the frame 4. The thermometer tube may be held in place by any suitable cementing or positioning agency or material between its walls and the walls of the openings or passageways through or into which it extends. The lower end of the tubular section 3' may be open to permit the vapors or water in the radiator to reach directly the bottom of the thermometer tube, also the plunger adjacent to the lower end of the thermometer may be perforated as indicated at $3^e$ so as additionally to expose the thermometer tube to the vapors or circulating liquid at the top of the radiator.

8 is a cup-shaped element arranged in and carried by the shell or cap 2. It may be secured in position in any suitable manner. This cup-shaped element 8 has an axial opening 8', alined with the boss 2ᵇ and through which extends the plunger head 3ᵇ. It preferably carries a plurality of lugs 8ᵃ. 9 is a retainer washer. It may be secured to the lugs 8ᵃ in any suitable manner. Rivets 10 for this purpose are shown. Between the retainer washer 9 and the bottom wall 8ᵇ of the cup-shaped element 8 is arranged a clamp ring 11. This ring is formed with radial arms 11', 11', separated from each other at their inner ends, which are enlarged at 11ᵃ and recessed at 11ᵇ to receive the plunger or operating head 3ᵇ. The ring 11 is formed of resilient material and split as indicated at 11ᶜ to permit of its expansion and contraction.

12 is an annular gasket of any suitable material such as soft rubber interposed between the cap piece 2 and the cup-shaped element 8, and disposed, when the device is in operative position, to engage the upper edge of the neck piece 1 to form a packing ring between the device and the neck piece so as to preclude the escape of vapor or steam and also to obviate rattling and chattering of the parts.

The operation of the device will be readily understood.

When the plunger is in the position illustrated in Fig. 2, the clamp ring 11 is expanded so as to engage the end wall of the flange or shoulder 1' and properly position and hold the indicator and closure relatively to the radiator. In order to remove the device the tubular section 3 is drawn outwardly, merely by the operator grasping and pulling outwardly upon the frame 4, until the plunger head 3ᵇ engages the under wall of the shell 2' and the nose of the head 3ᵇ has permitted the ring 11 to contract so as to free itself from the under wall of the flange 1', whereupon the device may be moved or withdrawn entirely to expose the inlet opening of the filler duct 1ᵃ. The parts of the device are then in the relative positions illustrated in Fig. 5. When it is desired to replace the device, the shell 2' is positioned on the duct 1ᵃ and the operator presses downwardly on the frame 4 simultaneously expanding the ring 11, and this movement continues until the frame 4 and the correlated parts are again in the position illustrated in Fig. 2. The tubular section 3' and frame 4 as an entirety may be considered the support for the thermometer tube.

The parts are so constructed and correlated that when in the relative positions shown in Fig. 2, they will maintain such position without chattering or rattling about and also will substantially preclude the escape of vapor from the radiator. Furthermore in the illustrated embodiment of my invention the indicator actually forms a part of the closure in that it extends through and closes an opening through the cap of the closure and serves as a handle for the closure.

While in the drawings I have illustrated an embodiment of my invention in which the attaching and detaching of the cap or closure is controlled by longitudinal reciprocation of the indicator relative thereto, and the indicator is a thermometer, it will be understood that my invention broadly comprehends and the claims are intended to cover all mechanical ways of correlating a radiator filler cap or closure and an indicator of the condition of the circulating medium within the radiator, whereby a predetermined movement of said indicator or a part thereof relative to the filler cap, which supports said indicator, serves to attach or detach the filler cap, be such movements of the indicator longitudinal reciprocating or any other relative movement which one skilled in the art might substitute to effect the same general purpose.

To those skilled in the art of making mechanism of the class described, many alterations in construction and widely differing embodiments and applications of my invention will suggest themselves, without departing from the spirit and scope thereof.

My disclosures and the descriptions herein are purely illustrative and are not intended to be in any sense limiting.

What I claim is:

1. Radiator indicator attaching and positioning mechanism, including a radiator indicator, comprising a thermometer tube and a support therefor, a cap having an opening through it to receive said tube support, which latter extends through said opening and projects on opposite sides of said cap and is movable relatively thereto, and attaching and detaching devices carried by said cap and shaped to be engaged and actuated by said tube support during relative movement between it and said cap.

2. Radiator indicator attaching and positioning mechanism, including a radiator indicator, comprising a thermometer tube and a support therefor, a cap having an opening through it to receive said tube support, which latter extends through said opening and projects on opposite sides of said cap and is movable relatively thereto, attaching and detaching devices carried by and shaped to be engaged and actuated by said tube support during relative movement between it and said cap, and a radiator filler duct having an inlet port and means to co-act with said attaching and detaching devices to effect the closing of said inlet port by said cap.

3. Radiator indicator attaching and positioning mechanism, including a radiator indicator, comprising a thermometer tube and a support therefor, a cap having an opening through it to receive said tube support, which latter extends through said opening and projects on opposite sides of said cap, and is movable relatively thereto, and expansible and contractible attaching and detaching devices carried by said cap, said tube support having at its inner end a section shaped to receive and position the lower end of said thermometer tube and to engage and coöperate with said attaching and detaching devices to actuate the latter during relative movement between said indicator and said cap.

4. Radiator indicator attaching and positioning mechanism, including a radiator indicator, comprising a thermometer tube and a support therefor, a cap having an opening through it to receive said tube support, which latter extends loosely through said opening and projects on opposite sides of said cap and is longitudinally movable relatively thereto, and attaching and detaching devices carried by said cap, said tube support having at its inner end a section shaped to receive and position the inner end of said thermometer tube and disposed to engage and control the operation of said attaching and detaching devices by longitudinal movement of said indicator relatively to said cap.

5. Radiator indicator attaching and positioning mechanism, including a radiator indicator, comprising a thermometer tube and a support therefor, a cap having an opening through it to receive said tube support, which latter extends loosely through said opening and projects on opposite sides of said cap and is movable relatively thereto, and attaching and detaching devices carried by said cap, said tube support having its inner end shaped and disposed to engage and actuate said cap attaching and detaching devices during relative movement between said tube support and cap, and its outer end shaped and disposed to serve as an operating handle.

In testimony whereof I affix my signature.

EDWARD R. ALEXANDER.